(12) United States Patent
Wu (10) Patent No.: US 9,656,443 B2
(45) Date of Patent: May 23, 2017

(54) STABLE SOLUTION OF RING-OPENED POLYMER AND THE USE THEREOF

(75) Inventor: Hsin-Ho Wu, Chupei (TW)

(73) Assignee: TAIWAN UNION TECHNOLOGY CORPORATION, Chupei (TW)

(*) Notice: Subject to any disclaimer, the term of this patent is extended or adjusted under 35 U.S.C. 154(b) by 1303 days.

(21) Appl. No.: 13/345,035

(22) Filed: Jan. 6, 2012

(65) Prior Publication Data

US 2013/0101862 A1 Apr. 25, 2013

(30) Foreign Application Priority Data

Oct. 19, 2011 (TW) .............................. 100137867 A (51) Int. Cl.
| | | |
|---|---|---|
| C08G 73/02 | (2006.01) |
| C08G 59/56 | (2006.01) |
| B32B 15/14 | (2006.01) |
| C08G 59/50 | (2006.01) |
| C08G 59/40 | (2006.01) |

(52) U.S. Cl.
CPC .......... *B32B 15/14* (2013.01); *B32B 2255/02* (2013.01); *B32B 2255/26* (2013.01); *B32B 2260/023* (2013.01); *B32B 2262/101* (2013.01); *B32B 2305/076* (2013.01); *B32B 2457/08* (2013.01); *C08G 59/4071* (2013.01); *C08G 59/5046* (2013.01); *C08G 73/0246* (2013.01); *Y10T 428/31678* (2015.04)

(58) Field of Classification Search
CPC . B32B 15/14; B32B 2255/02; B32B 2255/26; B32B 2260/023; B32B 2262/101; B32B 2305/076; B32B 2457/08; C08G 59/5046; C08G 59/4071; C08G 73/0246; Y10T 428/31678
See application file for complete search history.

(56) References Cited

U.S. PATENT DOCUMENTS

| | | | |
|---|---|---|---|
| 5,021,484 A | 6/1991 | Schreiber et al. | |
| 7,446,160 B2 | 11/2008 | Wang et al. | 528/167 |
| 9,006,377 B2* | 4/2015 | Wu | 528/168 |
| 2011/0152453 A1* | 6/2011 | Tietze et al. | 524/879 |
| 2011/0257347 A1 | 10/2011 | Lin et al. | |

FOREIGN PATENT DOCUMENTS

| | | | | |
|---|---|---|---|---|
| CN | 1039602 A | | 2/1990 | |
| CN | 101220152 A | * | 7/2008 | |
| JP | 2004197032 A | * | 7/2004 | |
| TW | I285653 B | | 8/2007 | ............. C08G 59/40 |
| TW | 201121986 A1 | | 7/2011 | |

OTHER PUBLICATIONS

Lin, C. H., Cai, S. X., Leu, T. S., Hwang, T. Y. and Lee, H. H. (2006), Synthesis and properties of flame-retardant benzoxazines by three approaches. J. Polym. Sci. A Polym. Chem., 44: 3454-3468. doi: 10.1002/pola.21454.*
Machine translation of JP 2004197032 (2004).*
Machine translation of CN 101220152 (2008).*

* cited by examiner

*Primary Examiner* — Callie Shosho
*Assistant Examiner* — John Freeman
(74) *Attorney, Agent, or Firm* — Michael W. Ferrell; Ferrells, PLLC; Anna L. Kinney (57) ABSTRACT

A stable solution of a ring-opened polymer is provided. The stable solution can be prepared using the following steps:
(d) adding an N,O-heterocyclic compound of formula I or II and a DOPO-based compound into an organic solvent to provide a reaction solution:

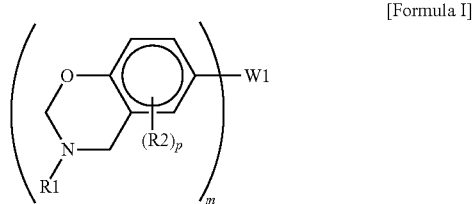

[Formula I]

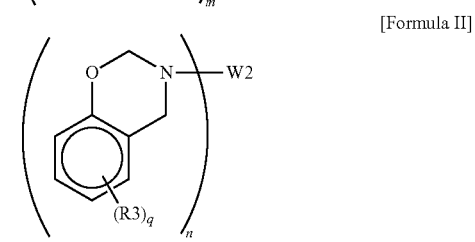

[Formula II]

wherein R1 to R3, W1, W2, m, n, p and q are as defined in the specification.
(e) heating the reaction solution to carry out a ring-opening reaction to provide a polymer solution; and
(f) cooling the polymer solution to obtain the stable solution, wherein the organic solvent is unreactive to the N,O-heterocyclic compound and the DOPO-based compound, and the amount of the DOPO-based compound is about 0.01 wt % to about 50 wt % based on the total weight of the N,O-heterocyclic compound and the DOPO-based compound. The stable solution is useful as a self-crosslinkable resin or a hardener for hardening epoxies.

15 Claims, 2 Drawing Sheets

STABLE SOLUTION OF RING-OPENED POLYMER AND THE USE THEREOF

CLAIM FOR PRIORITY

This application claims priority to Taiwan Patent Application No. 100137867 filed on Oct. 19, 2011, the disclosure of which is incorporated herein by reference in its entirety.

CROSS-REFERENCES TO RELATED APPLICATIONS

Not applicable.

BACKGROUND OF THE INVENTION

Field of the Invention

The present invention relates to a stable solution of a ring-opened polymer. Specifically, the present invention relates to a stable solution which is obtained from the ring-opening reaction of an N,O-heterocyclic compound and a DOPO-based compound. The stable solution is useful for the preparation of a laminate.

Descriptions of the Related Art

Printed circuit boards are circuit substrates that are used for electronic devices to load other electronic components and to electrically connect the components to provide a stable circuit working environment. One kind of conventional printed circuit board is a copper clad laminate (CCL), which is primarily composed of resin(s), reinforcing material(s), and copper foil(s). Conventional resins include epoxy resins, novolac resins, polyamine formaldehydes, silicones and Teflon®; and conventional reinforcing materials include glass fiber cloths, glass fiber mats, insulating papers and linen cloths.

Generally, a printed circuit broad can be prepared as follows: immersing a reinforcing material such as a glass fiber fabric into a resin; curing the immersed glass fiber fabric to a half-hardened state, i.e. B-stage, to obtain a prepreg; superimposing certain layers of the prepregs and superimposing a metal foil on at least one external surface of the superimposed prepregs to provide a superimposed object; hot-pressing the superimposed object, i.e. C-stage, to obtain a metal clad laminate; etching the metal foil on the surface of the metal clad laminate to form a defined circuit pattern; and finally, digging a plurality of holes on the metal clad laminate and plating these holes with a conductive material to form via holes to accomplish the preparation of the printed circuit broad.

In consideration of the subsequent electronic processes, a printed circuit board substrate must be provided with a certain thermal resistance, size stability, chemical stability, processability, toughness, mechanical strength etc. Generally, epoxy resin is the most popular resin in the printed circuit board industry since the printed circuit broad prepared with the use of epoxy resin can properly meet the above requirements. Epoxy resin, a reactive monomer, is a general name for organic polymer compounds with two or more epoxy groups in the molecular structure. A highly cross-linked net structure can be obtained by polymerizing molecules with high epoxy group content. Although such a highly cross-linked net structure possesses a relatively high hardness and glass transition temperature (Tg) as well as good chemical resistance, it is fragile and possesses poor impact resistance and both are disadvantageous to the subsequent process.

In view of the above, N,O-heterocyclic compounds with a structure are now commonly used in substitution for epoxy resin or as a hardener to regulate epoxy resin. Due to a high proportion of benzene rings and C—N bonds in the structure, the N,O-heterocyclic compounds possess excellent thermal properties (such as thermal resistance, glass transition temperature and flammability), chemical properties and mechanical properties. In addition, the polymer prepared from a ring-opening polymerization of N,O-heterocyclic compounds has a large number of hydroxyl groups in its structure and a novolac laminate can be provided by the cross-linking reaction of the polymer itself. The use of the polymer in combination with an epoxy resin may enhance the thermal properties and mechanical properties of a final product and lower the contractility of the product so as to provide a high level laminate.

However, the flammability of the laminate prepared provided by the cross-linking reaction of the N,O-heterocyclic compound is insufficient, and thus, a phosphorus-containing flame retardant such as DOPO is usually applied to enhance the flammability of the prepared laminate. TW 1285653 discloses a phosphorus-containing cured benzoxazine resin, wherein an N,O-heterocyclic compound is mixed with DOPO-based compound powder and the resultant mixture is cured under high temperature and pressure to produce a substrate with improved flammability. However, the method is energy-consuming and incapable of controlling the reaction uniformity well.

The present invention provides a stable solution of a ring-opened polymer, which is a solution comprising a polymer of an N,O-heterocyclic compound and a DOPO-based compound.

SUMMARY OF THE INVENTION

An object of the invention is to provide a stable solution of a ring-opened polymer, which can be prepared using the following steps:

(a) adding an N,O-heterocyclic compound of formula I or II and a DOPO-based compound into an organic solvent to provide a reaction solution:

[Formula I]

[Formula II]

wherein R1 is selected from the group consisting of a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2-C15 unsaturated hydrocarbyl, a naphthol group, a phenanthrenol group, and a dicyclopentadienyl; R2 and R3 are independently selected from the group consisting of H, a halogen, a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2-C15 unsaturated hydrocarbyl, a naphthol group, a phenanthrenol group and a dicyclopentadienyl; W1 is selected from the group consisting of H, a halogen, an ether group, a thioether group, a sulfonyl, a sulfinyl, a carbonyl, a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; W2 is selected from the group consisting of a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; m and n are independently integers ranging from 1 to 3; p is an integer ranging from 1 to 3; and q is an integer ranging from 1 to 4;
(b) heating the reaction solution to carry out a ring-opening polymerization to provide a polymer solution; and
(c) cooling the polymer solution to obtain the stable solution,
wherein the organic solvent is unreactive to the N,O-heterocyclic compound and the DOPO-based compound, and the amount of the DOPO-based compound is about 0.01 wt % to about 50 wt % based on the total weight of the N,O-heterocyclic compound and the DOPO-based compound.

Another object of the invention is to provide a prepreg which is prepared by immersing a substrate into the stable solution mentioned above and drying the immersed substrate.

Yet another object of the invention is to provide a laminate comprising a synthetic layer and a metal layer, wherein the synthetic layer is made from the prepreg mentioned above.

To render the above objects, technical features and advantages of the present invention more apparent, the present invention will be described in detail with reference to some embodiments hereinafter.

DESCRIPTION OF THE PREFERRED EMBODIMENT

The following will describe some embodiments of the present invention in detail. However, without departing from the spirit of the present invention, the present invention may be embodied in various embodiments and should not be limited to the embodiments described in the specification. In addition, unless it is additionally explained, the expressions "a," "the," or the like recited in the specification (especially in the claims) should include the singular and the plural forms. Furthermore, unless it is additionally explained, while describing the constituents in the solution, mixture and composition in the specification, the amount of each constituent is counted based on the solid content, i.e., disregarding the weight of the solvent.

The stable solution of the present invention contains a polymer obtained from the ring-opening reaction of an N,O-heterocyclic compound and a DOPO based compound. The polymer is provided with excellent solvent-compatibility and a small molecular weight so that no precipitation from the stable solution would occur even when the solution is stored for a long period of time. The stable solution of the present invention can be used to prepare a novolac laminate or further react with an epoxy resin to provide a high level laminate. The product prepared from the stable solution of the present invention is provided with outstanding flammability.

Specifically, the stable solution of the present invention may be prepared using the following steps:
(a) dissolving an N,O-heterocyclic compound and a DOPO-based compound into an organic solvent to provide a reaction solution;
(b) heating the reaction solution to carry out a ring-opening polymerization to provide a polymer solution; and
(c) cooling the polymer solution to obtain the stable solution.

In step (a), the N,O-heterocyclic compound has the structure of formula I or II:

[Formula I]

[Formula II]

wherein R1 is selected from the group consisting of a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; R2 and R3 are independently selected from the group consisting of H, a halogen (e.g., F, Cl, Br, or I), a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; W1 is selected from the group consisting of H, a halogen, an ether group, a thioether group, a sulfonyl, a sulfinyl, a carbonyl, a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; W2 is selected from the group consisting of a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; m and n are independently integers ranging from 1 to 3; p is an integer ranging from 1 to 3; and q is an integer ranging from 1 to 4.

In both formulas I and II, m and n are associated with the binding numbers of W1 and W2 respectively. For example, in reference to formula I, without being restricted by any theory, when m is 1, W1 is a group with a single bond, such as H, a halogen, a methyl group etc., and the N,O-heterocyclic compound is a compound with one N,O-heterocyclic structure; when m is 2, W1 is a linking group with two bonds and the N,O-heterocyclic compound is a compound with two N,O-heterocyclic structures, and so forth.

In some embodiments of the present invention, the N,O-heterocyclic compounds are provided by means of a chemical syntheses from a phenol compound, an aldehyde compound and an amine compound, as described hereinafter. Preferably, W1 and W2 are independently selected from the group consisting of or both m and n are 2 and the N,O-heterocyclic compound has a structure of formula I' or II':

[Formula I']

[Formula II']

A specific example of the N,O-heterocyclic compound suitable for the present invention is

In step (a), the DOPO-based compound is selected from a group consisting of 9,10-dihydro-9-oxa-10-phosphaphenanthrene-10-oxide (DOPO) and its derivatives. In some embodiments of the present invention, the DOPO-based compound is selected from the group consisting of -continued and combinations thereof. For example, (DOPO)

is illustrated as the DOPO-based compound in the following examples.

It is known that DOPO-based compounds can improve the flammability of the product. However, it is believed that DOPO-based compounds will also adversely increase the $H_2O$ absorption of the product. Therefore, in the stable solution of the present invention, the amount of the DOPO-based compound is preferably about 0.01 wt % to about 50 wt %, more preferably about 10 wt % to about 40 wt %, based on the total weight of the N,O-heterocyclic compound and DOPO-based compound. If the amount of the DOPO-based compound is less than 0.01 wt %, the flammability of the product may not be improved significantly; and if the amount of the DOPO-based compound is more than 50 wt %, the $H_2O$ absorption of the product may be significantly increased. In some embodiments of the present invention, the amount of the DOPO-based compound is about 20 wt % to about 40 wt %, based on the total weight of the N,O-heterocyclic compound and the DOPO-based compound.

In step (a), the organic solvent may be any solvent that can dissolve but not react with the N,O-heterocyclic compound and the DOPO-based compound. The solvent is preferred to have a catalytic effect on the ring-opening polymerization. In view of operation convenience, the boiling point of the organic solvent should be at least higher than the maximum operating temperature involved in the preparation of the stable solution and generally around the temperature for the ring-opening polymerization. The purpose of controlling the boiling point is to avoid the organic solvent from escaping during the operation, and thus, change the concentration of the reaction solution which may cause difficulty in the subsequent process (e.g., the solution may become too thick to stir) or influence the quality of the prepared polymer solution (e.g., the polymerization degree may be non-uniform).

Without departing from the above conditions, the organic solvent used in step (a) may be selected from the group consisting of cyclohexanone, acetone, butanone, methyl isobutyl ketone, N,N-dimethyl formamide (DMF), N,N-dimethylacetamide (DMAc), N-methyl-pyrrolidone (NMP) and combinations thereof. In some embodiments of the present invention, the organic solvent is DMF.

The organic solvent should be used in an amount that can dissolve the N,O-heterocyclic compound and the DOPO-based compound while also be able to stably dissolve/disperse the ring-opened polymer produced from the ring-opening polymerization in the organic solvent without any precipitation. Generally, the amount of organic solvent is usually not less than about 10 parts by weight. For example, the amount of organic solvent may be about 10 parts by weight to about 150 parts by weight, preferably about 20 parts by weight to about 120 parts by weight, per 100 parts by weight of the total weight of the N,O-heterocyclic compound and the DOPO-based compound. However, the amount of the organic solvent should not be limited to the amount mentioned above, and persons with ordinary skill in the art can vary the amount of organic solvent depending on the needs based on the disclosure of the specification. In some embodiments of the present invention, the amount of organic solvent is about 100 parts by weight per 100 parts by weight of the total weight of the N,O-heterocyclic compound and the DOPO compound.

In step (b), after the N,O-heterocyclic compound and the DOPO-based compound are uniformly dissolved into the organic solvent to form the reaction solution, the reaction solution is heated to carry out the ring-opening addition/polymerization reaction. The reaction solution should be heated to a temperature at least higher than the softening temperature of the N,O-heterocyclic compound to carry out the ring-opening addition/polymerization reaction without using an expensive and environmentally hazardous catalyst. In addition, said temperature should be lower than the boiling point of the organic solvent to prevent the organic solvent from escaping during the operation and then change the concentration of the reaction solution, which may result in difficulty for the subsequent process or influence the quality of the prepared polymer solution.

The energy required for the heating in step (b) may be supplied by any possible means. For example, the energy can be supplied through thermal energy (such as a water bath, an oil bath, an electric heater, and a heat exchanger), radiant energy (such as ultraviolet irradiation, gamma irradiation), or combinations thereof, to raise the temperature of the reaction solution to carry out the ring-opening addition/polymerization reaction. To raise the uniformity of heat transfer and thus, the reaction, preference is given to stir the reaction solution during heating.

After the ring-opening polymerization in step (b), a polymer solution is provided. Then, in step (c), the polymer solution is cooled down to substantially terminate the ring-opening polymerization and thus, obtain the stable solution of the present invention. The term "substantially terminate" means the polymerization between the N,O-heterocyclic compounds, between the polymers and between the N,O-heterocyclic compounds and the polymers are considerably ceased, so that the molecular weight of the polymer in the polymer solution will not change significantly during a specific storage period and thus, the precipitation of the polymer can be avoided. The temperature for terminating the ring-opening addition/polymerization reaction is associated with the species of the N,O-heterocyclic compound and the DOPO-based compound, and is preferably room temperature (but not limited thereto). Based on the disclosure of the specification and the following examples, persons skilled in the art can choose a suitable temperature to terminate the ring-opening addition/polymerization reaction. In addition, there is no special limitation on the cooling means in step (c). For example, the cooling can be achieved by subjecting the polymer solution to a gas atmosphere at room temperature or a water bath at room temperature or a combination thereof to lower the temperature of the polymer solution.

The stable solution of the present invention is obtained after the cooling in step (c). The stable solution may be used to prepare a novolac laminate or further react with an epoxy resin to provide a high level laminate (e.g., an FR4 laminate). When reacting with an epoxy resin, the stable solution of present invention acts as a hardener for shortening the curing time period.

Therefore, the present invention, together with an epoxy resin, can form a resin composition which comprises the following:
an epoxy resin; and
a hardener, which is the stable solution of the present invention,
wherein, based on the solid content, the amount of the hardener is about 20 parts by weight to about 200 parts by weight per 100 parts by weight of the epoxy resin.

In the resin composition of the present invention, the epoxy resin contained is a resin with at least two epoxy groups in the molecular structure, such as a novolac epoxy resin, a bromine-containing epoxy resin, etc. In some embodiments of the present invention, a novolac epoxy resin is illustrated as the epoxy resin.

In the resin composition of the present invention, the amount of the hardener can be adjusted depending on the users' needs. Generally, in view of cost efficiency, based on the solid content, the amount of the hardener is preferably about 20 parts by weight to about 200 parts by weight, more preferably about 70 parts by weight to about 120 parts by weight per 100 parts by weight of the epoxy resin, but not limited thereto.

The resin composition of the present invention may optionally further comprise other additives, such as a hardening promoter, filler, a dispersing agent (e.g., a silane coupling agent), a mold-release agent, a flame retardant, a toughening agent etc. For example; a hardening promoter selected from a group consisting of imidazole, 1-methyl-imidazole (1MI), 2-methyl-imidazole (2MI), 2-ethyl-4-methyl-imidazole (2E4MI), 2-phenyl-imidazole (2PI) and combinations thereof, but not limited thereto, may be added to improve hardening effect. The amount of the hardening promoter, if used, is generally about 0.01 parts by weight to about 1 part by weight per 100 parts by weight of the epoxy resin. Also, a filler selected from the group consisting of silica, glass powder, talcum, kaolin, pryan, mica and combinations thereof, may be added to improve the properties of the epoxy resin such as the processability, flammability, thermal resistance and moisture resistance. The amount of the filler, if used, is generally about 0.01 parts by weight to about 80 parts by weight per 100 parts by weight of the epoxy resin.

The resin composition of the present invention may be prepared in varnish form by evenly mixing the epoxy resin, the stable solution (as a hardener), and additives (optionally) through a stirrer; and dissolving or dispersing the mixture into a solvent, for subsequent applications.

The present invention further provides a prepreg which is prepared by completely coating the aforementioned stable solution or resin composition to the surfaces of a substrate (reinforcing material) and drying the coated substrate, e.g., by immersing the substrate into the stable solution of the present invention or the resin composition of the present invention and drying the immersed substrate. A conventional reinforcing material includes a glass fiber cloth (a glass fiber fabric, a glass fiber paper, a glass fiber mat, etc.), a kraft paper, a short fiber cotton paper, a nature fiber cloth, an organic fiber cloth, etc. In some embodiments of the present invention, 7628 glass fiber cloths are illustrated as the reinforcing materials, and the reinforcing materials are heated and dried at 175° C. for 2 to 5 minutes (B-stage) to provide prepregs in a half-hardened state.

The present invention further provides a laminate comprising a synthetic layer and a metal layer, wherein the synthetic layer is made from the prepreg mentioned above. The laminate may be prepared by the following process: superimposing a plurality of prepregs and superimposing a metal foil (such as a copper foil) on at least one external surface of the superimposed prepregs to provide a superimposed object; performing a hot-pressing operation onto the object to obtain the laminate. Moreover, a printed circuit board can be obtained by patterning the metal foil of the laminate.

The present invention will be further illustrated by the embodiments hereinafter, wherein the measuring instruments and methods are respectively as follows:

[Gel Permeation Chromatography (GPC) Analysis]
Gel permeation chromatography of Waters company (model No.: waters 600).

[Infrared Spectroscopic Analysis]
Fourier-transform infrared spectrometer of Perkin-Elmer company (model No.: Spectrum 100).

[Differential Scanning Calorimetry (DSC) Analysis]
Differential scanning calorimetry of Perkin-Elmer, Inc. (model No.: DSC 7).

[Glass transition Temperature (Tg) Test]
The glass transition temperature is measured by a differential scanning calorimetry of Perkin-Elmer, Inc. (model No.: DSC 7), wherein the measuring regulations are IPC-TM-650.2.4.25C and 24C testing method of Institute for Interconnecting and Packaging Electronic Circuits (IPC).

[Dielectric Constant (Dk) and Dissipation Factor (Df) Measurement]
Dk and Df are measured according to ASTM D150 under an operating frequency of 1 GHz.

[$H_2O$ Absorption Test]
The $H_2O$ absorption of the laminate is tested by the pressure cooker test (PCT), i.e., subjecting the laminate into a pressure container (121° C., 100% R.H. and 1.2 atm) for 1 hr.

[Coefficient of Thermal Expansion (CTE) Test and Z-Axis Expansion Percentage (%) Test]

The through-thickness CTE (in z-axis direction) and the z-axis expansion % of the sample (a laminate in a size of 3 mm$^2$) are tested by the thermal expansion analyzer of TA instrument company (model No.: TA 2940) between a temperature gap ranging from about 50° C. to 260° C. (heating rate: 10° C./min).

[Toughness Test]

The method for testing the toughness comprises the following steps: laying the laminate on a plane fixture; vertically placing a cross metal jig to come into contact with the surface of the laminate while applying a vertically-applied pressure to the cross metal jig; removing the cross metal jig; and observing the cross trace on the laminate. The laminate without any white embossing lines is regarded as having a good toughness, the one with slight white embossing lines is regarded as having a normal toughness, and the one with cracks or ruptures is regarded as having a poor toughness.

[Flammability Test]

The flammability test is carried out according to UL94V (Vertical Burn), which comprises the burning of a vertically-held printed circuit board, using a Bunsen burner to obtain its self-ignition and combustion-supporting properties. The result is classified from UL94V-0 (the best) to UL94V-2.

EXAMPLES

<The Preparation of the N,O-heterocyclic Compound>

784 g of bisphenol A, 458 g of aniline and 600 g of toluene were added into a 3 L separable four-necked flask to form a synthetic solution. The four-necked flask was equipped with a heating device, a thermometer, a stirrer, a cooling pipe, a dropper and a decompression recovery device. The synthetic solution was heated to a temperature of about 40° C. and stirred evenly. While stirring, 819 g of 44% formaldehyde in toluene was added dropwise into the synthetic solution in 20 minutes, and at this time, the temperature of the synthetic solution was raised to about 90° C. The synthetic solution was then heated and kept at about 90° C. and reacted for 3 hours. Without being limited by theories, it is believed that the reaction is as follows.

N, O-heterocyclic compound 1

After heating and stirring were discontinued after about 20 minutes, the synthetic solution was separated into two layers. The water phase and the trace amount of emulsion in the upper layer were then removed. Instantly, the residual solution was again heated to about 90° C. and then the solvent therein was recovered by a decompressing manner (maintaining the pressure to lower than about 90 mmHg). After the solvent was completely recovered (the temperature was raised to about 130° C.), about 1380 g of N,O-heterocyclic compound 1 was obtained.

<The Preparation of the Stable Solution>

Example 1

According to the ratio shown in Table 1, N,O-heterocyclic compound 1, 9,10-dihydro-9-oxa-10-phosphaphenanthrene-10-oxide (DOPO) and N,N-dimethyl-foramide (DMF) were added into a 2 L reactor. The reactor was heated to about 100° C. to 110° C. and maintained for 2 hours while stirring. Then, the reactor was cooled to room temperature to obtain stable solution 1. The above procedures was repeated to prepare stable solution 2 except that the amounts of N,O-heterocyclic compound 1 and DOPO were changed to be 300 g and 200 g respectively.

The weight average molecular weight and number average molecular weight of stable solution 1 and stable solution 2 were measured and tabulated in Table 1.

TABLE 1

| composition | unit | stable solution 1 | stable solution 2 |
|---|---|---|---|
| N,O-heterocyclic compound 1 | g | 400 | 300 |
| DOPO | g | 100 | 200 |
| DMF | g | 500 | 500 |
| weight average molecular weight | g/mole | 2720 | 2953 |
| number average molecular weight | g/mole | 1614 | 1785 |

Figure 1:
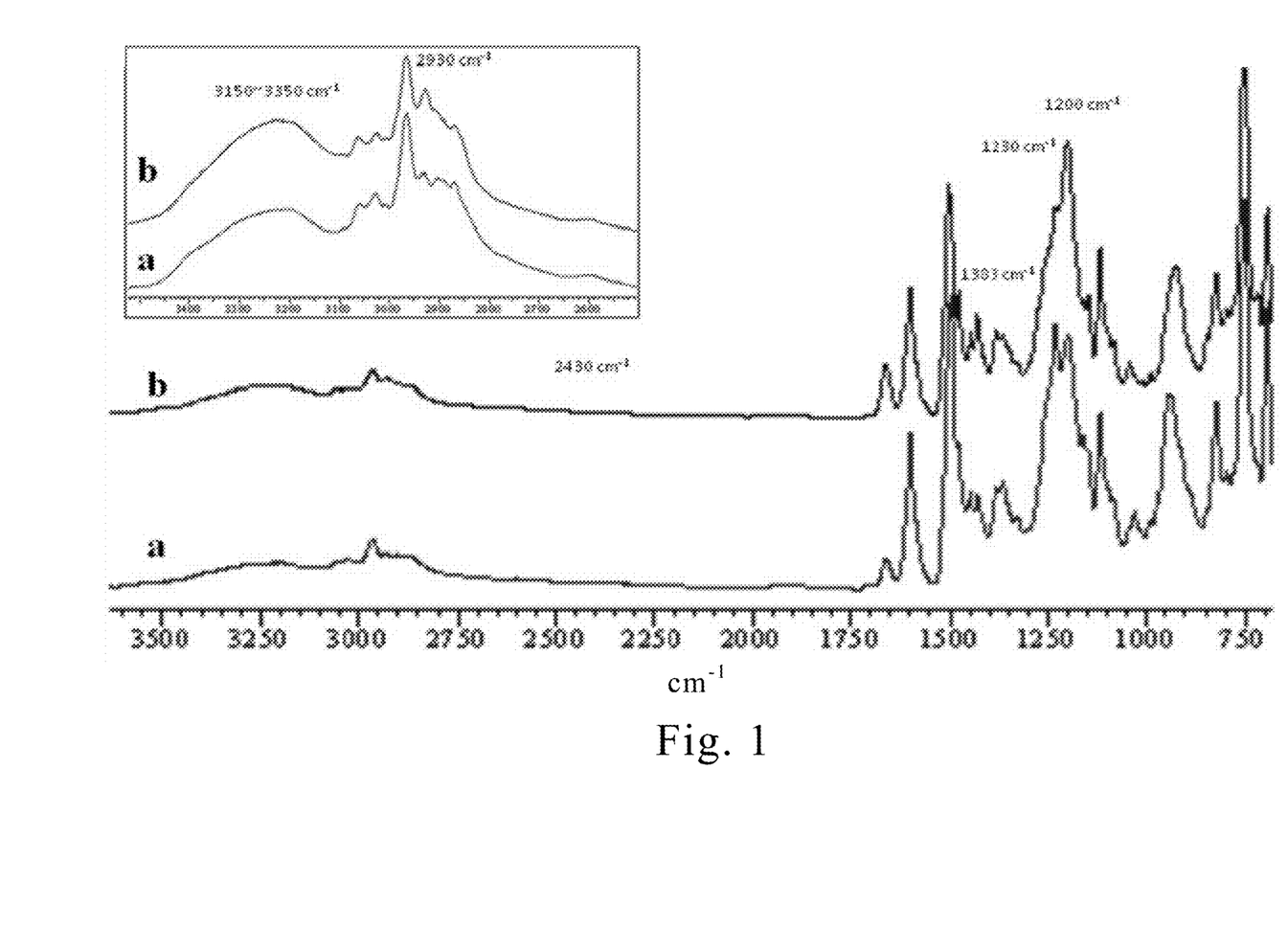
FIG. 1 shows the IR spectrum of a stable solution of the present invention.

FIG. 1 shows the IR spectrum of stable solution 1 and stable solution 2. As shown in FIG. 1, there are characteristic peaks of hydroxyl groups and methylene groups, generated from the ring-opening polymerization of the N,O-heterocyclic compound, at about 3150 cm$^{-1}$ to 3350 cm$^{-1}$ and about 2930 cm$^{-1}$. The drop of the signal strength at 1230 cm$^{-1}$ and the raise of the signal strength at 1383 cm$^{-1}$ respectively represent the drop in —COC— concentration and the raise in —CNC— concentration, and both of which are due to the ring-opening polymerization. In addition, the characteristic peak of PH bonding is located at about 2430 cm$^{-1}$ and not observed in FIG. 1, which means that DOPO has bonded to N,O-heterocyclic compound 1 and thus, PH bonding is vanished. Furthermore, the peak at 1200 cm$^{-1}$ is the characteristic peak of the P=O bonding of DOPO. As can be seen from the above, N,O-heterocyclic compound 1 in stable solutions 1 and 2 was ring-opened and bonded with DOPO.

Figure 2A:
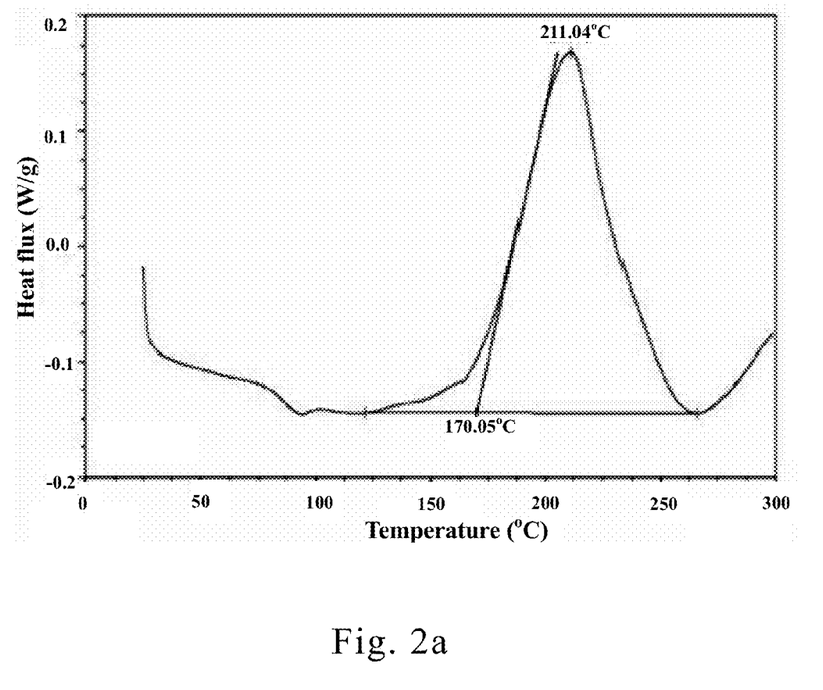
FIG. 2a shows the differential scanning calorimetry (DSC) analysis result of a stable solution of the present invention.
Figure 2B:
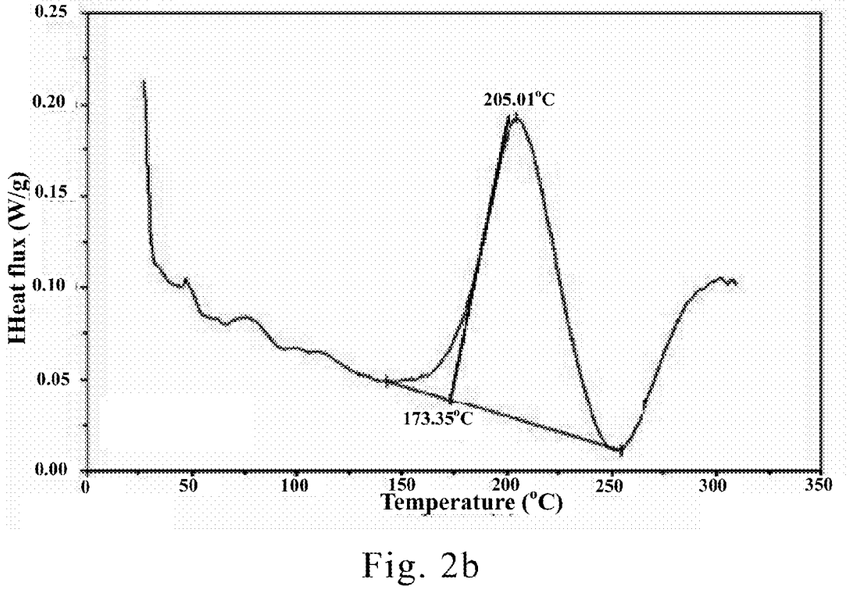
FIG. 2b shows the differential scanning calorimetry (DSC) analysis result of another stable solution of the present invention.

FIGS. 2a and 2b are respectively the DSC analysis results of stable solution 1 and stable solution 2. As can be seen from the figures, the melting point of the polymer in stable solution 1 is about 80° C. to 90° C. and the maximum temperature of the ring-opening reaction is about 211° C. The melting point of the polymer in stable solution 2 is about 80° C. to 90° C. and the maximum temperature of ring-opening reaction is about 205° C.

<The Preparation of the Laminate>

Example 2: The Preparation of the Novolac Laminate

The novolac laminate was prepared by using stable solution 1. In detail, stable solution 1 was coated on a plurality of 7628 glass fiber cloths by a roll coater. The coated 7628 glass fiber cloths were then placed in a dryer and dried at 175° C. for 2 to 5 minutes to prepare prepregs in a half-hardened state (resin/glass fiber cloth: 43%). Four pieces of the prepregs were superimposed and two copper foils were respectively superimposed on the two external surfaces of the superimposed prepregs to provide a superimposed object. A hot-pressing operation was performed onto the superimposed object to provide novolac laminate 1 (a copper clad laminate), wherein the hot-pressing conditions are as follows: raising the temperature to 200° C. with a heating rate of 2.0° C./min, and hot-pressing for 90 minutes under the full pressure of 15 kg/cm$^2$ (the initial pressure is 8 kg/cm$^2$) at 200° C. The measured glass transition temperature (Tg) of novolac laminate 1 is about 160° C. and the measured flammability grade (UL94) of novolac laminate 1 is V0.

<The Reparation of the Resin Composition>

Example 3

According to the ratio indicated in Table 2, Bisphenol A novolac epoxy resin (Kolon chemical; KOLON 3165), stable solution 1, 2-methylimidazole (2-MI) and methyl isobutyl ketone (MEK) were uniformly mixed under room temperature with a stirrer to prepare resin composition A and resin composition B respectively.

TABLE 2

| composition ratio (parts by weight) | novolac resin | stable solution 1 | stable solution 2 | 2-MI | MEK |
|---|---|---|---|---|---|
| Resin composition A | 100 | 80 | — | 0.05 | 100 |
| Resin composition B | 100 | — | 80 | 0.05 | 100 |

Example 4: The Preparation of FR4 Laminates

FR4 laminates were prepared by using resin composition A and B respectively. In detail, either resin composition A or B was coated on a plurality of 7628 glass fiber cloths by a roll coater. The coated 7628 glass fiber cloths were then placed in a dryer and dried at 175° C. for 2 to 5 minutes to prepare prepregs in a half-hardened state (resin/glass fiber cloth: 43%). Four pieces of the prepregs were superimposed and two copper foils were respectively superimposed on the two external surfaces of the superimposed prepregs to provide a superimposed object. A hot-pressing operation was performed onto the superimposed object to provide laminate A and laminate B (copper clad laminates), wherein the hot-pressing conditions are as follows: raising the temperature to 200° C. with a heating rate of 2.0° C./min, and hot-pressing for 90 minutes under the full pressure of 15 kg/cm$^2$ (the initial pressure is 8 kg/cm$^2$) at 200° C.

The glass transition temperature (Tg), dielectric constant (Dk), dissipation factor (Df), H$_2$O absorption, coefficient of thermal expansion, toughness and flammability of laminate A and laminate B were analyzed and tabulated in Table 3.

TABLE 3

| | property | | | | | | |
|---|---|---|---|---|---|---|---|
| Unit | Tg ° C. | Dk GHz | Df GHz | H2O absorption % | thermal expansion coefficient ppm/° C. | toughness | UL94 grade |
| Laminate A | 195 | 4.2 | 0.012 | 0.40 | 33 | Excellent | V0 |
| Laminate B | 180 | 4.3 | 0.012 | 0.50 | 35 | Excellent | V0 |

As shown in Table 3, the laminates prepared using the resin composition containing the stable solution of the present invention as a hardener are provided with outstanding physicochemical properties, such as outstanding flammability, outstanding electrical characteristics, and low H$_2$O absorption.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A stable solution of a ring-opened polymer, which is in a state to be used as a self-crosslinkable resin or a hardener for an epoxy resin and is prepared using the following steps:

(a) adding an N,O-heterocyclic compound of formula I or II and a DOPO-based compound into an organic solvent to provide a reaction solution:

[Formula I]

[Formula II]

wherein R1 is selected from the group consisting of a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; R2 and R3 are independently selected from the group consisting of H, a halogen, a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; W1 is selected from the group consisting of H, a halogen, an ether group, a thioether group, a sulfonyl, a sulfinyl, a carbonyl, a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; W2 is selected from the group consisting of a substituted or unsubstituted C1-C10 alkyl, a substituted or unsubstituted C3-C10 cycloalkyl, a substituted or unsubstituted C6-C20 aryl, a substituted or unsubstituted C6-C20 aryloxy, a substituted or unsubstituted C2 to C15 unsaturated hydrocarbyl, a naphthol group, a phenanthrenol group and a dicyclopentadienyl; m and n are independently integers ranging from 1 to 3; p is an integer ranging from 1 to 3; and q is an integer ranging from 1 to 4;

(b) heating the reaction solution to carry out a ring-opening polymerization to provide a polymer solution; and (c) cooling the polymer solution to substantially terminate the ring-opening polymerization to obtain the stable solution, wherein the organic solvent is unreactive to the N,O-heterocyclic compound and the DOPO-based compound, and the amount of the DOPO-based compound is about 0.01 wt % to about 50 wt % based on the total weight of the N,O-heterocyclic compound and the DOPO-based compound, and wherein the DOPO-based compound is selected from the group consisting of:

and combinations thereof.

2. The stable solution of claim 1, wherein the amount of the DOPO-based compound is about 10 wt % to about 40 wt % based on the total weight of the N,O-heterocyclic compound and the DOPO-based compound.

3. The stable solution of claim 2, wherein the N,O heterocyclic compound is and the DOPO-based compound is 4. The stable solution of claim 2, wherein the organic solvent is selected from the group consisting of cyclohexanone, acetone, butanone, methyl isobutyl ketone, N,N-dimethyl formamide (DMF), N,N-dimethyl acetamide (DMAc), N-methyl-pyrrolidone (NMP) and combinations thereof.

5. The stable solution of claim 4, wherein the organic solvent is N, N-dimethyl formamide.

6. The stable solution of claim 4, wherein the amount of the organic solvent is about 10 parts by weight to about 150 parts by weight per 100 parts by weight of the total amount of the N,O heterocyclic compound and the DOPO-based compound.

7. The stable solution of claim 1, wherein m and n are independently 2 or 3 and W1 and W2 are independently selected from the group consisting of:

with the proviso that W2 is not

8. The stable solution of claim 7, wherein the N,O heterocyclic compound is and the DOPO-based compound is 9. The stable solution of claim 7, wherein the organic solvent is selected from the group consisting of cyclohexanone, acetone, butanone, methyl isobutyl ketone, N,N-dimethyl formamide (DMF), N,N-dimethyl acetamide (DMAc), N-methyl-pyrrolidone (NMP) and combinations thereof.

10. The stable solution of claim 9, wherein the organic solvent is N, N-dimethyl formamide.

11. The stable solution of claim 9, wherein the amount of the organic solvent is about 10 parts by weight to about 150 parts by weight per 100 parts by weight of the total amount of the N,O heterocyclic compound and the DOPO-based compound.

12. The stable solution of claim 1, wherein the N,O heterocyclic compound is and the DOPO-based compound is 13. The stable solution of claim 1, wherein the organic solvent is selected from the group consisting of cyclohexanone, acetone, butanone, methyl isobutyl ketone, N,N-dimethyl formamide (DMF), N,N-dimethyl acetamide (DMAc), N-methyl-pyrrolidone (NMP) and combinations thereof.

14. The stable solution of claim 13, wherein the organic solvent is N, N-dimethyl formamide.

15. The stable solution of claim 13, wherein the amount of the organic solvent is about 10 parts by weight to about 150 parts by weight per 100 parts by weight of the total amount of the N,O heterocyclic compound and the DOPO-based compound.

* * * * *